United States Patent [19]

Yamamoto

[11] Patent Number: 4,637,210
[45] Date of Patent: Jan. 20, 1987

[54] SUPERCHARGE PRESSURE CONTROL APPARATUS OF A SUPERCHARGED ENGINE

[75] Inventor: Wataru Yamamoto, Shizuoka, Japan

[73] Assignee: Suzuki Jidosha Kogyo Kabushiki Kaisha, Shizuoka, Japan

[21] Appl. No.: 770,531

[22] Filed: Aug. 28, 1985

[30] Foreign Application Priority Data

Aug. 31, 1984 [JP] Japan .................... 59-181790

[51] Int. Cl.⁴ .................................... F02B 37/12
[52] U.S. Cl. .................................................. 60/602
[58] Field of Search ............... 60/600, 601, 602, 603, 60/611

[56] References Cited

U.S. PATENT DOCUMENTS 4,483,146 11/1984 Morikawa ..................... 60/602
4,485,626 12/1984 Moriguchi ..................... 123/425

FOREIGN PATENT DOCUMENTS 146023 9/1982 Japan ....................... 60/602
57-206727 12/1982 Japan .

Primary Examiner—Douglas Hart
Attorney, Agent, or Firm—Flynn, Thiel, Boutell & Tanis

[57] ABSTRACT

There is a supercharge pressure control apparatus of a supercharged engine. A bypass is provided to bypass a supercharger turbine arranged between the intake and exhaust passages. A waste gate valve is attached at one end of the bypass and is coupled to an actuator having a pressure chamber communicated with a connecting passage which is branched at a branch point into the first and second passages. A first port is formed in the intake passage downstream near a suction inlet of a compressor and a second port is formed in the intake passage downstream of the first port. In the stationary operating state, the connecting passage is communicated with the second passage by the change-over valve, so that a high pressure from the second port acts on the pressure chamber and the supercharge pressure is maintained at a set level. In the acceleration operating state, the connecting passage is communicated with the first passage for a predetermined time, so that a low pressure from the first port acts on the pressure chamber. When the pressure at the first port reaches the set level, the pressure at the second port exceeds the set level, so that the supercharge pressure over the set level is supplied into the engine. After a preset time, the connecting passage is communicated with the second passage and the pressure is held at the set level.

1 Claim, 4 Drawing Figures

SUPERCHARGE PRESSURE CONTROL APPARATUS OF A SUPERCHARGED ENGINE

FIELD OF THE INVENTION

The present invention relates to a supercharge pressure control apparatus of a supercharged engine and, more particularly, to a supercharge pressure control apparatus of a supercharged engine in which, in the acceleration operating state, the supercharge pressure can be set to be higher than a preset supercharge pressure while improving the supercharge pressure characteristic in a low-speed rotation range.

BACKGROUND OF THE INVENTION

In supercharged engines, since the supercharge pressure increases in proportion to the rotating speed of the engine, if the supercharge pressure increases too much, the supercharger or the internal combustion engine can be damaged. Therefore, for example, the durability of the engine is maintained by preventing the supercharge pressure from exceeding a preset value by way of a control apparatus for the waste gate system or the like, in which when the supercharge pressure of the intake passage downstream of the supercharger compressor exceeds a set value, a bypass which is provided so as to bypass the supercharger turbine is opened to drain a part of the exhaust air and thereby control the supercharge pressure.

On one hand, in conventional apparatuses of the waste gate system, if the supercharge pressure is controlled to become constant in order to satisfy the durability of the engine, then in the case where high engine power is temporarily required as in an accelerating operation, the required power performance is not achieved, so that there is a drawback such that the desired acceleration performance cannot be satisfied. Therefore, an apparatus which can control the supercharge pressure at a few stages has been proposed. However, in a conventional apparatus, as shown in FIG. 4, the supercharge pressure (indicated by an alternate long-and-short dash line) in the acceleration operating state of the engine is merely set higher than the supercharge pressure (indicated by a dotted line in FIG. 4) in the stable operating state of the engine, and the supercharge pressure before the interception point is not made high. Consequently, improvement in acceleration performance of the engine in the low-speed rotation range cannot be expected.

In addition, among such apparatuses, for instance, as disclosed in Japanese Patent Unexamined Publication No. 29728/1984, there is an apparatus in which a solenoid valve for allowing the operating supercharge pressure to be communicated with or shut off from the atmosphere is provided through a throttle in the way of the passage to lead the operating supercharge pressure into an actuator and thereby control the supercharge pressure at a few stages. However, this apparatus has a drawback in that the efficiency of the supercharger compressor deteriorates since a part of the supercharge pressure leaks.

SUMMARY OF THE INVENTION

It is an object of the present invention to provide a supercharge pressure control apparatus of a supercharged engine in which the characteristic of the supercharge pressure in a low-speed rotation range is improved in the acceleration operating state by a simple constitution, and the supercharge pressure can be set to be higher than a preset supercharge pressure within a range (i.e., a low-speed rotational range) where the durability of the engine is not lost and without allowing the supercharge pressure to leak, and without causing a deterioration in efficiency of the supercharger compressor.

This object is accomplished by a supercharge pressure control apparatus of a supercharged engine comprising: a supercharger having a turbine therein arranged between an intake passage and an exhaust passage of the engine; a bypass passage, arranged so as to bypass the turbine, for allowing the output side of the engine to be communicated with the exhaust passage; a waste gate valve which is arranged at one end of the bypass passage and is opened or closed in dependence on the operating state of the engine; an actuator, having a pressure chamber, coupled to the gate valve; a connecting passage communicating at one end with the actuator pressure chamber; first and second passages branched at the other end as a branch point of the connecting passage; a compressor, arranged in the intake passage, for compressing the intake air which is supplied through the intake passage; a first port formed in the intake passage downstream of a suction inlet to the compressor at a location near the suction inlet; a second port formed in the intake passage downstream of the first port at a location apart from the suction inlet of the compressor; the first passage communicating with the first port and the second passage communicating with the second port; and a change-over valve arranged at the branch point of the communicating passage, whereby the connecting passage communicates with the second passage in the stable operating state of the engine and communicates with the first passage for a predetermined time in the acceleration operating state of the engine due to a switching operation of the change-over valve.

According to the invention, a high supercharge pressure is supplied from the second port through the connecting passage into the actuator pressure chamber, thereby limiting the supercharge pressure to a set level in the stable operating state of the engine at a low load. However, in the acceleration operating state, a low supercharge pressure is supplied from the first port into the pressure chamber. Thus, when the supercharge pressure at the first port reaches the set pressure level, the supercharge pressure at the second port exceeds the set pressure level, so that a supercharge pressure in excess of the set level is supplied into the internal combustion engine. After expiration of a predetermined time, the connecting passage is again communicated with the second passage, so that the superchar pressure is returned to the set level.

DETAILED DESCRIPTION

Figure 2:
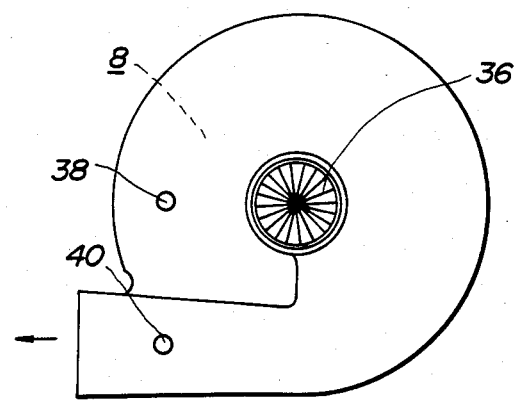
FIG. 2 is a side elevational view of a supercharger in the apparatus of FIG. 1.
Figure 3:
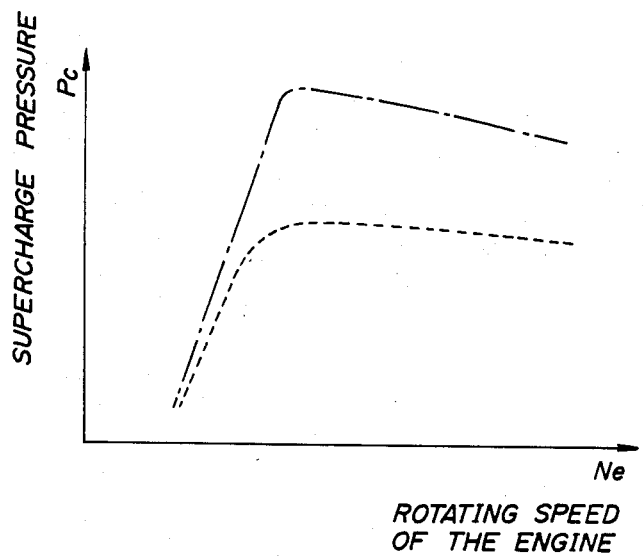
FIG. 3 is a graph showing the relation between the supercharge pressure and the rotating speed of the engine in the embodiment of the invention.
Figure 4:
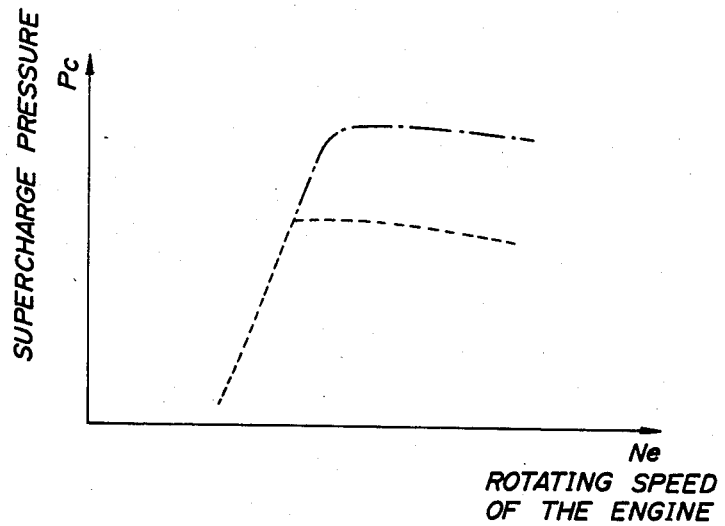
FIG. 4 is a graph showing the relation between the supercharge pressure and the rotating speed of an engine of a conventional apparatus.

An embodiment of the present invention will now be described in detail hereinbelow with reference to FIGS. 1 to 3.

Figure 1:
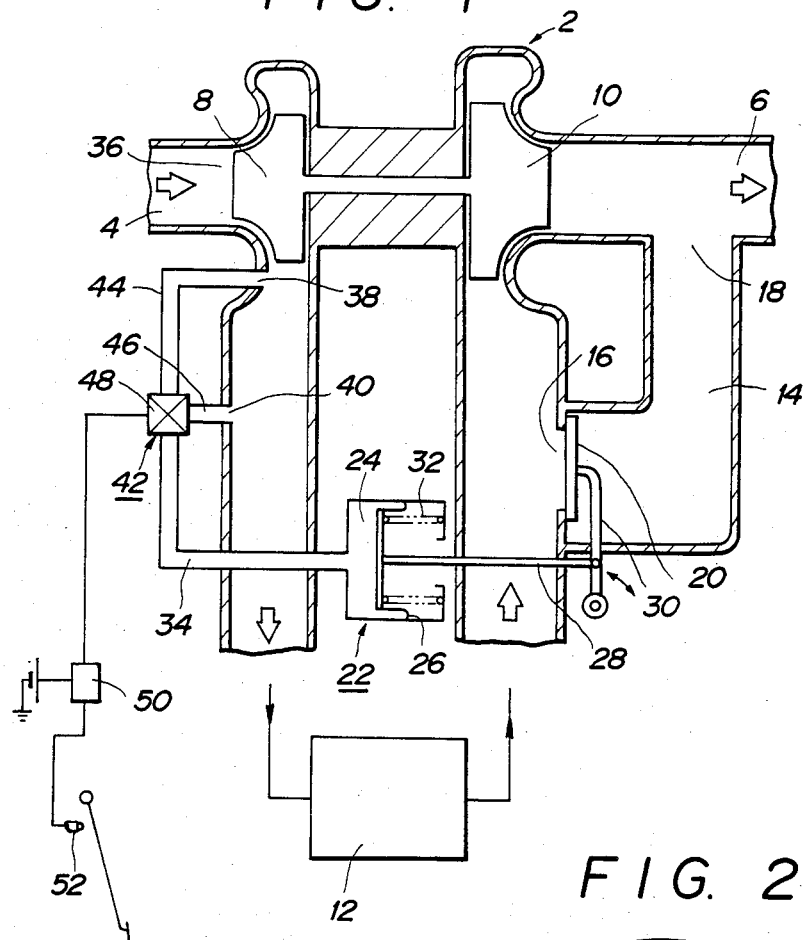
FIG. 1 is a schematic cross-sectional view of an apparatus in an embodiment according to the present invention.

In FIG. 1, reference numeral 2 denotes a supercharger of the exhaust air turbine type; 4 is an intake passage; 6 an exhaust passage; 8 a compressor; and 10 a turbine. The supercharger 2 is provided between the intake passage 4 and the exhaust passage 6 which are respectively communicated with an internal combustion engine 12. The compressor 8 is arranged to coaxially face an upstream section of the intake passage 4, while the turbine 10 is arranged to coaxially face a downstream section of the exhaust passage 6. The compressor 8 is rotated by the turbine 10, thereby supplying the compressed air into the engine 12 through the downstream section of the intake passage.

A bypass passage 14 is provided to communicate the downstream section of the exhaust passage 6 with the engine 12 by bypassing the turbine 10 of the supercharger 2. Practically speaking, one end of the bypass 14 opens at an inlet 16 formed in the exhaust passage 6 upstream of the turbine 10 and the other end opens at an outlet 18 formed in the exhaust passage 6 downstream of the turbine 10. A waste gate valve 20 of the swinging type is provided at the inlet 16 at the upstream end of the bypass 14 to thereby open or close the inlet 16.

The opening operation of the waste gate valve 20 is controlled by an actuator 22. A pressure chamber 24 of the actuator 22 is defined by a diaphragm 26. The diaphragm 26 is coupled with a pivot lever 30 of the waste gate valve 20 by a rod 28. In order to shut off the valve 20 through the rod 28 and lever 30, a shut-off spring 32 urges the diaphragm 26 leftwardly so that the pressure chamber 24 is reduced. In order to open the waste gate valve 20 as closed by the shut-off spring 32, a connecting passage 34 is provided for allowing the supercharge pressure from downstream of the compressor to communicate with the pressure chamber 24 and act on the diaphragm 26.

In the compressor 8 of the turbo-type as shown in FIG. 1, the supercharge pressure becomes low as it approaches a suction inlet 36 which is just upstream of the compressor. Therefore, the supercharge pressure for activating the actuator 22 has conventionally been taken out of the intake passage 4 on the downstream side at a location that is spaced from the suction inlet 36. The present invention pays attention to the foregoing principle such that the supercharge pressure decreases as it approaches the suction inlet 36. Practically speaking, as shown in FIGS. 1 and 2, a first port 38 is provided in the intake passage 4 on the downstream side of the compressor 8 near the suction inlet 36 of the compressor, while a second port 40 is provided in the intake passage 4 on the downstream side that is spaced apart from the suction inlet 36 and is also spaced downstream from the port 38. Thus, the supercharge pressure at the first port 38 is lower than that at the second port 40. In addition, the difference between the supercharge pressures at the ports 38 and 40 becomes large as the amount of air is less. The supercharge pressure which is supplied to the engine 12 is controlled due to such difference in supercharge pressure that is caused in the intake passage 4.

Namely, one end of the connecting passage 34 is opened into and is communicated with the pressure chamber 24 of the actuator 22, while the other end is branched at a branch point 42 to form a first passage 44 and a second passage 46. The first passage 44 is communicated with the first port 38. The second passage 46 is communicated with the second port 40.

A change-over valve 48 is arranged at the branch point 42 of the connecting passage 34. The change-over valve 48 performs a change-over operation in dependence on the operating state of the engine and allows the connecting passage 34 to be selectively communicated with either of the first and second passages 44 and 46. In other words, when a control unit 50 detects that the engine is in a stationary (i.e. stable) operating state due to the opening of a throttle switch 52, the change-over valve 48 is switched such that the connecting passage 34 communicates with the second passage 46. Thus, a high supercharge pressure acts on the pressure chamber 24 of the actuator 22. When the control unit 50 detects that the engine is in an acceleration operating state due to the closure of the throttle switch 52, the valve 48 is switched such that the passage 34 communicates with the first passage 44 for a predetermined time. Thus, a low supercharge pressure acts on the pressure chamber 24. The control unit 50 includes a conventional timer (not shown) therein. The time of communication between the passage 34 and the first passage 44 is measured by this timer. After expiration of said predetermined time, the change-over valve 48 performs a switching operation in a manner such that the communication between the passages 34 and 44 is shut off and then the passage 34 again communicates with the second passage 46.

Although the throttle switch 52 has been shown as an example of a mechanism to detect the stable operating state and the acceleration operating state, the present invention is not limited to this switch. For instance, the operating state can be detected by way of a throttle valve opening sensor to detect the opening state of a carburetor throttle valve, a pressure sensor to detect the pressure in the intake passage, or the like.

The operation of the control apparatus of the embodiment will then be described.

Since the throttle switch 52 is open in the stable operating state of the engine due to a low load, the connecting passage 34 communicates with the second passage 46 through the change-over valve 48. Thus, a high supercharge pressure from the second port 40 acts on the pressure chamber 24 of the actuator 22. When the supercharge pressure acting on the pressure chamber 24 from the second port 40 exceeds a predetermined or preset level, the valve 20 is opened against the elastic force of the shut-off spring 32. Due to this, a part of the exhaust air is allowed to pass through the bypass passage 14 to thereby reduce the power of the turbine 10. This reduced turbine power is maintained so as to not exceed the predetermined supercharge pressure in accordance with the supercharge pressure characteristic indicated by a dotted line in FIG. 3.

When the engine is set into the acceleration operating state by pressing on the accelerator, the throttle switch 52 is closed and the change-over valve 48 is made operative, thereby permitting the passage 34 to communicate with the first passage 44. Thus, a low supercharge pressure at the first port 38 acts on the pressure chamber 24 of the actuator 22. Therefore, even if the supercharge pressure in the intake passage 4 downstream of the second port 40 reaches or exceeds the predetermined level, the supercharge pressure acting on the pressure chamber 24 is less than the predetermined level, so that the supercharge pressure which is supplied into the engine 12 increases over the predetermined level. When the supercharge pressure acting on the pressure chamber 24 from the first port 38 exceeds the predetermined level, the waste gate valve 20 is opened to thereby reduce the turbine power. In this case, the supercharge pressure which is supplied into the engine 12 becomes higher by an amount commensurate with the differential pressure between the ports 38 and 40 and exhibits a supercharge pressure characteristic (as indicated by an alternate long and short dash line in FIG. 3) which is higher than that in the stable operating state of the engine. Moreover, since the supercharge pressure characteristic is improved from a low-speed rotation range and is set to be higher than the predetermined supercharge pressure level, the accelerating performance from a low rotating speed can be improved.

After expiration of the predetermined time by the control unit 50, the change-over valve 48 shuts off the communication between the passage 34 and the first passage 44, and permits the passage 34 to again communicate with the second passage 46. Due to this, the supercharge pressure is again controlled so as not to exceed the preset level, thereby eliminating an adverse influence on the durability of the internal combustion engine 12 by the supercharge pressure exceeding the preset level.

As described above, according to the present invention, the connecting passage 34 communicates with the second passage 46 in the stable operating state of the engine due to the switching operation of the change-over valve 48 and the low supercharge pressure characteristic can be derived, while the connecting passage 34 communicates with the first passage 44 in the acceleration operating state of the engine and the high supercharge pressure characteristic is obtained. Due to this, the constitution of the control apparatus is simplified and the supercharge pressure characteristic in a low-speed rotation range is improved, while the supercharge pressure can be set to be higher than a preset level within a range where durability of the engine is not lost and hence the accelerating performance from low speed can be improved. In addition, since the supercharge pressure for making the actuator operative does not leak, a deterioration in the efficiency of the supercharger compressor is prevented. Thus, the actuator operates positively and the efficiency of the compressor is improved. Further, the supercharge pressure which is derived by the communication between the connecting passage 34 and the first passage 44 in the acceleration operating state is set to be higher than a preset supercharge pressure for only a predetermined time; accordingly, there is little risk that this high supercharge pressure will adversely affect the engine.

The control unit 50 for effecting switching of the change-over valve may assume many conventional forms, such as a solenoid for effecting valve switching.

The present invention is not limited to the foregoing embodiment but many modifications and variations are possible within the spirit and scope of the appended claims of the invention.

What is claimed is:

1. A supercharge pressure control apparatus for a supercharged engine, comprising:
   a supercharger turbine associated with an exhaust passage of the engine;
   a supercharge compressor associated with an intake passage of the engine for compressing a gas which is supplied through the intake passage to the engine, the compressor being driven by the turbine;
   bypass means associated with said exhaust passage for selectively permitting some of the exhaust gasses discharged from the engine and flowing through the exhaust passage to bypass the turbine, said bypass means including a bypass passage communicating with the exhaust passage for bypassing the turbine, and a bypass valve for controlling the opening and closing of the bypass passage;
   actuator means for controlling the opening and closing of said bypass valve, said actuator means including means associated therewith for normally maintaining said bypass valve in a closed position, said actuator means also including pressure responsive means for responding to the pressure of the gas in the intake passage for effecting selective opening of said bypass valve;
   first means for sensing the pressure of the gas in the intake passage at a first location disposed a substantial distance downstream of said compressor for activating said actuator means to effect opening of said bypass valve when the pressure in said intake passage at said first location exceeds a preset level;
   second means for sensing the pressure of the gas in the intake passage at a second location which is upstream a substantial distance from said first location but is disposed downstream of but closely adjacent to said compressor for activating said actuator means to effect opening of said bypass valve when the pressure at said second location exceeds said preset level, the pressure in said intake passage at said second location being lower than the pressure in said intake passage at said first location; and
   switching means for permitting said actuator means to be controlled by either said first sensing means or said second sensing means, but not by both at the same time; and
   control means for controlling said switching means so that said first sensing means communicates with said actuator means during a stable operational state of the engine and said second sensing means communicates with said actuator means during an accelerating operational state of the engine, said control unit including timing means associated therewith for permitting said second sensing means to control said actuator means for only a predetermined time interval, following which said switching means is automatically activated for causing the actuator means to again be controlled by said first sensing means.

* * * * *